United States Patent
Feldman et al.

(10) Patent No.: US 10,853,540 B2
(45) Date of Patent: Dec. 1, 2020

(54) METHOD AND SYSTEM FOR AUTOMATED DESIGN AND DESIGN-SPACE EXPLORATION

(71) Applicant: Palo Alto Research Center Incorporated, Palo Alto, CA (US)

(72) Inventors: Aleksandar B. Feldman, Santa Cruz, CA (US); Johan de Kleer, Los Altos, CA (US); Ion Matei, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/237,429

(22) Filed: Dec. 31, 2018

(65) Prior Publication Data
US 2020/0210535 A1    Jul. 2, 2020

(51) Int. Cl.
*G06F 30/327* (2020.01)
*G06F 111/04* (2020.01)
*G06F 111/20* (2020.01)

(52) U.S. Cl.
CPC ........ *G06F 30/327* (2020.01); *G06F 2111/04* (2020.01); *G06F 2111/20* (2020.01)

(58) Field of Classification Search
CPC .................................................... G06F 30/327
See application file for complete search history.

*Primary Examiner* — Jack Chiang
*Assistant Examiner* — Aric Lin
(74) *Attorney, Agent, or Firm* — Shun Yao; Park, Vaughan, Fleming & Dowler LLP

(57) ABSTRACT

One embodiment provides a method and a system for automated design of a computational system. During operation, the system obtains a component library comprising a plurality of computational components, receives design requirements of the computational system, and builds a plurality of universal component cells. A respective universal component cell is configurable, by a selection signal, to behave as one of the plurality of computational components. The system further constructs a candidate computational system using the plurality of universal component cells and encodes the received design requirements and the candidate computational system into a single logic formula. Variables within the single logic formula comprise at least inputs, outputs, and internal variables of the candidate computational system. The system solves the single logic formula to obtain at least one design solution for the computational system.

16 Claims, 12 Drawing Sheets

METHOD AND SYSTEM FOR AUTOMATED DESIGN AND DESIGN-SPACE EXPLORATION

BACKGROUND

Field

This disclosure is generally related to automated design of physical systems. More specifically, this disclosure is related to a system and method for providing automated design and design-space exploration.

Related Art

Design of physical systems can be the next frontier in artificial intelligence (AI). Providing automated tools for conceiving novel designs benefits many areas, such as analog and digital circuit design, software development, mechanical system design, and systems engineering. Automated design tools can assist human designers to better navigate complex trade-offs, such as speed versus number of transistors versus heat dissipation in an integrated circuit (IC) chip. The human designers can choose from a richer base of trade-offs, thus having the potential to provide dramatic improvements in technology.

SUMMARY

One embodiment provides a method and a system for automated design of a computational system. During operation, the system obtains a component library comprising a plurality of computational components, receives design requirements of the computational system, and builds a plurality of universal component cells. A respective universal component cell is configurable, by a selection signal, to behave as one of the plurality of computational components. The system further constructs a candidate computational system using the plurality of universal component cells and encodes the received design requirements and the candidate computational system into a single logic formula. Variables within the logic formula comprise at least selectors, inputs, outputs, and internal variables of the candidate computational system. The system solves the single logic formula to obtain at least one design solution for the computational system.

In a variation on this embodiment, encoding the received design requirements and the candidate computational system into the single logic formula can include constructing an equivalence checking circuit known as a miter structure based on the design requirements and the candidate computational system.

In a variation on this embodiment, constructing the candidate computational system can include constructing the candidate system based on a predetermined topology.

In a further variation, the variables within the single logic formula can include selection signals for the universal component cells, and solving the single logic formula can include searching for satisfying assignments to the selection signals.

In a variation on this embodiment, constructing the candidate computational system can include appending additional universal component cells, one cell at a time, to an initial universal component cell.

In a further variation, encoding the received design requirements and the candidate computational system into the single logic formula can include modeling the candidate computational system using a Boolean circuit comprising a plurality of tri-state buffers. A potential connection within the candidate computational system is modeled by an enable signal of a tri-state buffer corresponding to the potential connection, and solving the single logic formula can include at least searching for, possibly partial, satisfying assignments to enable signals of the tri-state buffers.

In a variation on this embodiment, encoding the received design requirements and the candidate computational system into the single logic formula can further comprise applying a plurality of predetermined constraints.

In a variation on this embodiment, the computational components in the component library comprise one or more of: a digital circuit gate, a quantum gate, an optical gate, and a reversible gate.

In a variation on this embodiment, the single logic formula comprises a quantified Boolean formula (QBF), and solving the single logic formula comprises implementing a QBF solver.

BRIEF DESCRIPTION OF THE FIGURES

In the figures, like reference numerals refer to the same figure elements.

DETAILED DESCRIPTION

Figure 1:
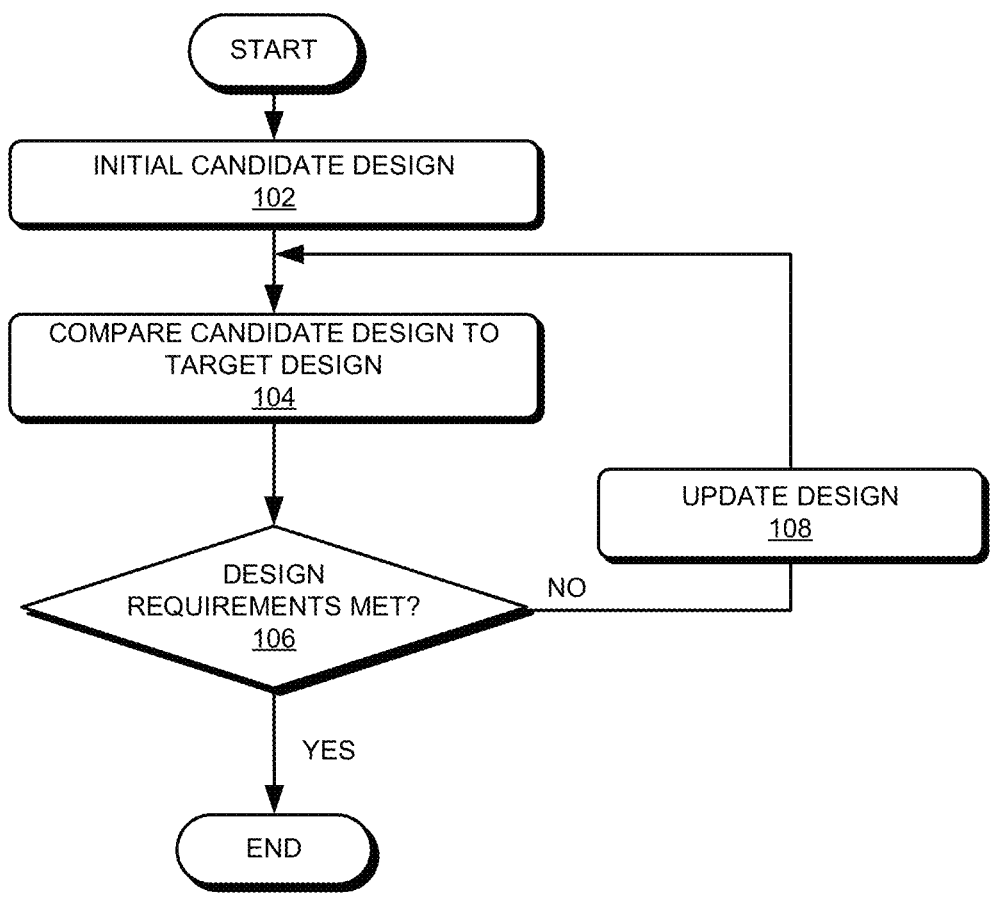
FIG. 1 shows a typical design generation process (prior art).

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of automated design of physical systems, more particularly systems implementing digital logic. During operation, the automated design system can reduce the problem of designing a digital system (e.g., physical systems having discrete parameters) to the problem of finding a satisfying solution of a Quantified Boolean Formula (QBF). During operation, the automated design system can construct a candidate circuit implementing universal component cells. More specifically, the automated design system can construct the candidate circuit by adding one component at a time, starting with a single component. A universal component cell can be configured to act as any one of the components in a pre-established component library. The system further models the topology of the candidate circuit using a Boolean circuit comprising tri-state buffers arranged into a two-dimensional grid, where each possible pair of input/output variables of the universal cells is connected through a distinct tri-state buffer. The enable signals of the tri-state buffers determine the circuit topology. The automated design system can also construct a miter circuit to facilitate equivalence checking. The miter formula can be, optionally, converted to a Conjunctive Normal Form (CNF) format, thus enabling the automated design system to implement a QBF solver to solve the QBF (e.g., to obtain assignments to the enable signals). A state-of-the-art QBF solver can then be used to solve the QBF under a set of predetermined constraints in order to ensure that the solutions are valid circuits. A complete QBF search can be performed to find all possible solutions. A designed circuit having the least number of components can sometimes be considered the optimal design.

Fundamentals of Digital Circuit Design

The tremendous improvements made in computation, representation, and tools used for designing digital circuit have made it possible to completely enumerate design space in order to obtain the optimum design. However, this can be challenging as some design spaces can be of exponential size or even infinite. Design schemes that can efficiently explore the design space of digital circuits are needed.

The design of physical systems often materializes from requirements, specifications, and the designer's experience. A typical design process can be iterative, with versions continuously improving and being refined. Incomplete designs or the initial versions often do not meet the design requirements and the designer uses a debugging process to improve the designs. Designers often create multiple alternative designs for users or system builders to choose from. The latter process is called "design exploration."

The design specifications or requirements are called "target design." Depending on the application domain, the target design can be a mechanical blueprint, an electrical diagram, algorithmic pseudocode, or human-readable text. FIG. 1 shows a typical design generation process. The design process typically starts with an initial candidate design (operation 102). The candidate design can be compared to the target design (operation 104) to determine whether the design requirements have been met (operation 106). If so, the design is done. If the design requirements have not been met, the design can be updated (operation 108). The updated design can be compared to the target design again (operation 104). This process can often be assisted by computer-aided design (CAD) tools and artificial intelligence (AI) algorithms. For example, CAD tools can be used to assist the designer to generate and update the design. System simulation tools can also be used to simulate the behaviors of the designed system in order to determine whether the design meets the design requirements. In certain situations, especially in cases of designing digital systems, it is possible to consider and exhaustively search the whole design space. However, many algorithms attempting to extensively search the design space often suffer from the combinatorior explosion problem.

To provide an automated design tool that can efficiently explore the digital design space without suffering from the combinatorior explosion problem, in some embodiments, the automated design tool can reduce the digital design problem to the problem of solving a QBF. Considering an arbitrary QBF formula:

$$Q_1 x_1 Q_2 x_2 \ldots Q_n x_n \phi(x_1, x_2, \ldots, x_n), \quad (1)$$

where $Q_1, Q_2, \ldots, Q_n$ are either existential ($\exists$) or universal ($\forall$) quantifiers and $x_i (i=1, \ldots n)$ are binary variables, it can be decided whether a formula is true or not by iteratively "unpeeling" the outermost quantifier until no quantifiers remain. Conditioning on the value of the first quantifier, one can obtain:

$$A = Q_2 x_2 \ldots Q_n x_n \phi(0, x_2, \ldots, x_n), \quad (2)$$

$$B = Q_2 x_2 \ldots Q_n x_n \phi(1, x_2, \ldots, x_n). \quad (3)$$

The formula is then reduced to $A \wedge B$ if $Q_1$ is universal ($\forall$) and $A \vee B$ if $Q_1$ is existential ($\exists$). This process of recursive formula evaluation resembles a game where alternating the quantifier types forces the solver to choose between looking for primal and dual solution of the formula $\phi$. The QBF solving process resembles the high-level generate-and-test process of designing a digital system. Hence, it is possible to reduce the design generation and exploration process to the process of solving a QBF.

A proposition formula or proposition expression can include variables and connectives. The standard connectives can include negation (NOT or ¬), conjunction (AND or ∧), disjunction (OR or ∨), exclusive or (XOR or ⊕), implication (→), and logical equivalence (↔). The variables can include both input and output variables.

Figure 2:
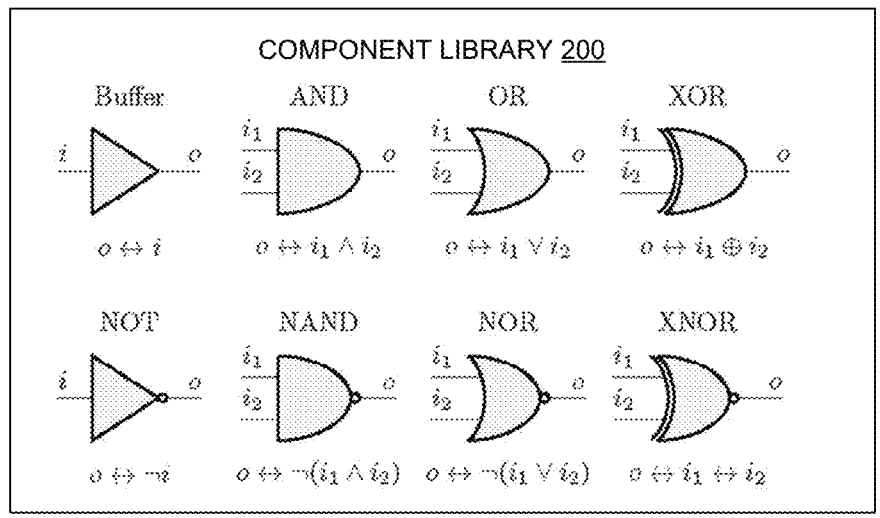
FIG. 2 illustrates an exemplary component library, according to one embodiment.
Figure 3:
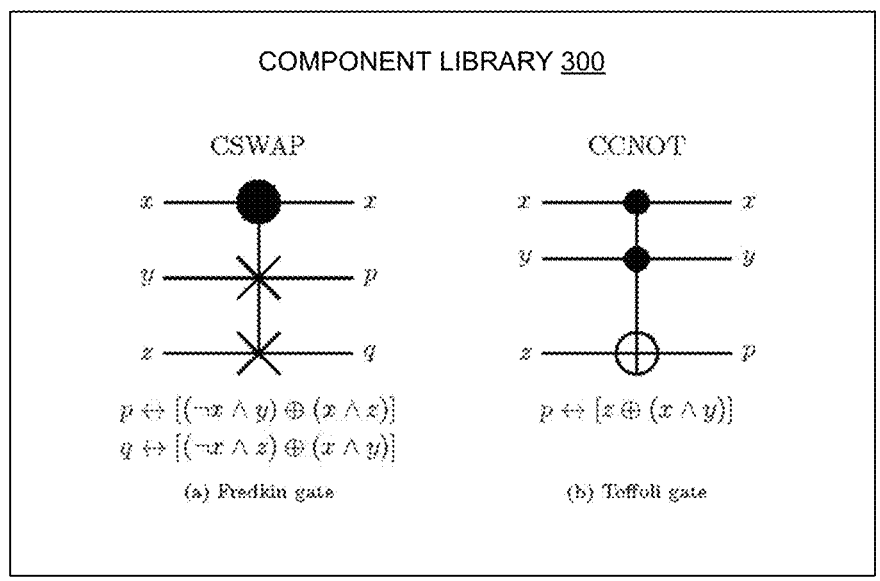
FIG. 3 illustrates an exemplary component library, according to one embodiment.

In some embodiments, the automated digital design system can obtain components from a predefined component library, which can include a set of computational components, each component being defined by a propositional formula. More specifically, a component library CL can be defined as: $CL = \{c_1, c_2, \ldots, c_n\}$, where $c_i (i=1, \ldots, n)$ is a propositional formula. FIG. 2 illustrates an exemplary component library, according to one embodiment. More specifically, component library 200 can include a number of digital circuit gates having one or two inputs, including AND, OR, XOR, NOT, NAND, NOR, and XNOR gates. Component library 200 can also include a buffer gate. The propositional formulas associated with these gates are also shown in FIG. 2. FIG. 3 illustrates an exemplary component library, according to one embodiment. More specifically, component library 300 can include a Fredkin gate and a Toffoli gate, which are also known as CSWAP (controlled-swap) and CCNOT (controlled-controlled-not) gates, respectively. Unlike the simpler single-output gates shown in FIG. 2, both the CSWAP and CCNOT gates have multiple outputs, and the order of both the inputs and outputs matters. These gates can have applications in reversible and quantum computing.

The automated digital design system can also use higher-level components as basic building blocks. For example, when designing an arithmetic-logic unit (ALU), the component library can include, in addition to standard logic gates, adders, multipliers, barrel shifters, etc.

The automated digital design system can define a digital circuit φ as a directed acyclic multigraph ⟨X∪Y∪C,E,f⟩, where the set of nodes, X∪Y∪C, consists entirely of three disjoint sets: the primary inputs X, the primary outputs Y, and the components C. E represents the topology. The map f:CL→C assigns a component library type to each component.

A typical design problem can be a component-selection problem, which involves designing a circuit φ from a given graph topology, such that the designed circuit φ can be equivalent to a target or goal circuit ψ. This design problem is concerned with the existence of an alternative design φ that shares the same connectivity as the target design ψ. The design exploration problem would count all possible component selections. On the other hand, a separate design problem can be a problem of counting component-selection configurations. This can involve counting the number of distinct maps $f_1, f_2, \ldots, f_n$, where $f_i$:CL→C for i=1, 2, ..., n, such that $\phi_i = \psi$.

One naïve approach to solving the aforementioned two problems is to consider all possible combinations of component types of up to k components. Such an approach can require performing an equivalence check for each combination of components, and the number of combinations increases exponentially as the number of components increases. Equivalence checking can be a coNP-hard problem and can be solved via various approaches. However, invoking many coNP-hard calls for solving the aforementioned two types of design problems is not an optimal or desirable approach.

Universal Component Cell

To simplify the representation of a digital system, in some embodiments, the automated digital design system implements universal component cells to represent the various components in its component library. A universal component cell can be a Boolean circuit that can be configured to perform as any one of the gates in a component library (e.g., component library 200 or 300 shown in FIG. 2 or FIG. 3, respectively). In some embodiments, universal component cells can be constructed dynamically by the automated digital design system depending on the content of the component library and the number of inputs and outputs.

Figure 4:
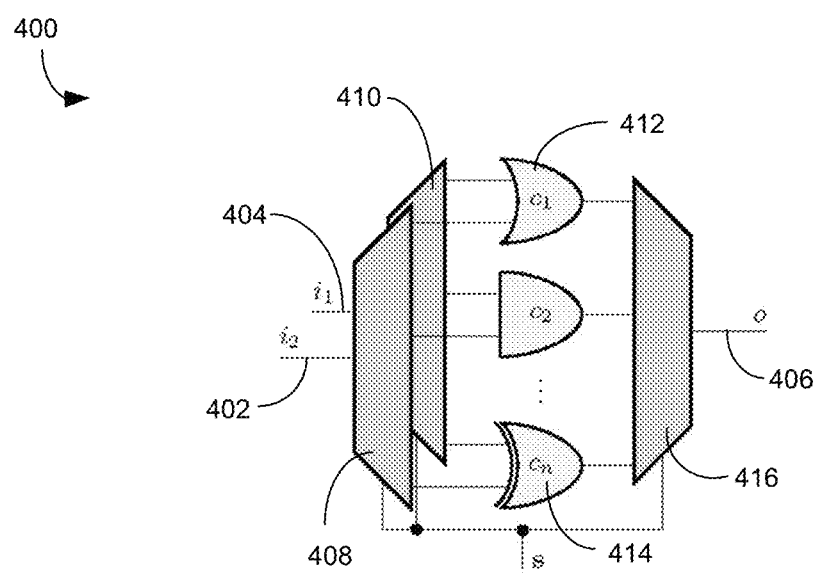
FIG. 4 illustrates an exemplary universal component cell, according to one embodiment.

FIG. 4 illustrates an exemplary universal component cell, according to one embodiment. Universal component cell 400 can include a number of input wires (e.g., input wires 402 and 404) and at least an output wire (e.g., output wire 406). Each input wire can be sent, via a demultiplexer (e.g., demultiplexer 408 or 410) to a set of components (e.g., components 412 and 414). In some embodiments, the set of components can include all components in a component library. For example, the set of components shown in FIG. 4 can include gates (e.g., the OR gate, the AND gate, the XOR gate, etc.) that belong to component library 300 shown in FIG. 3. The outputs of all components can be sent, via a multiplexer 416, to output wire 406.

Figures 5A, 5B:
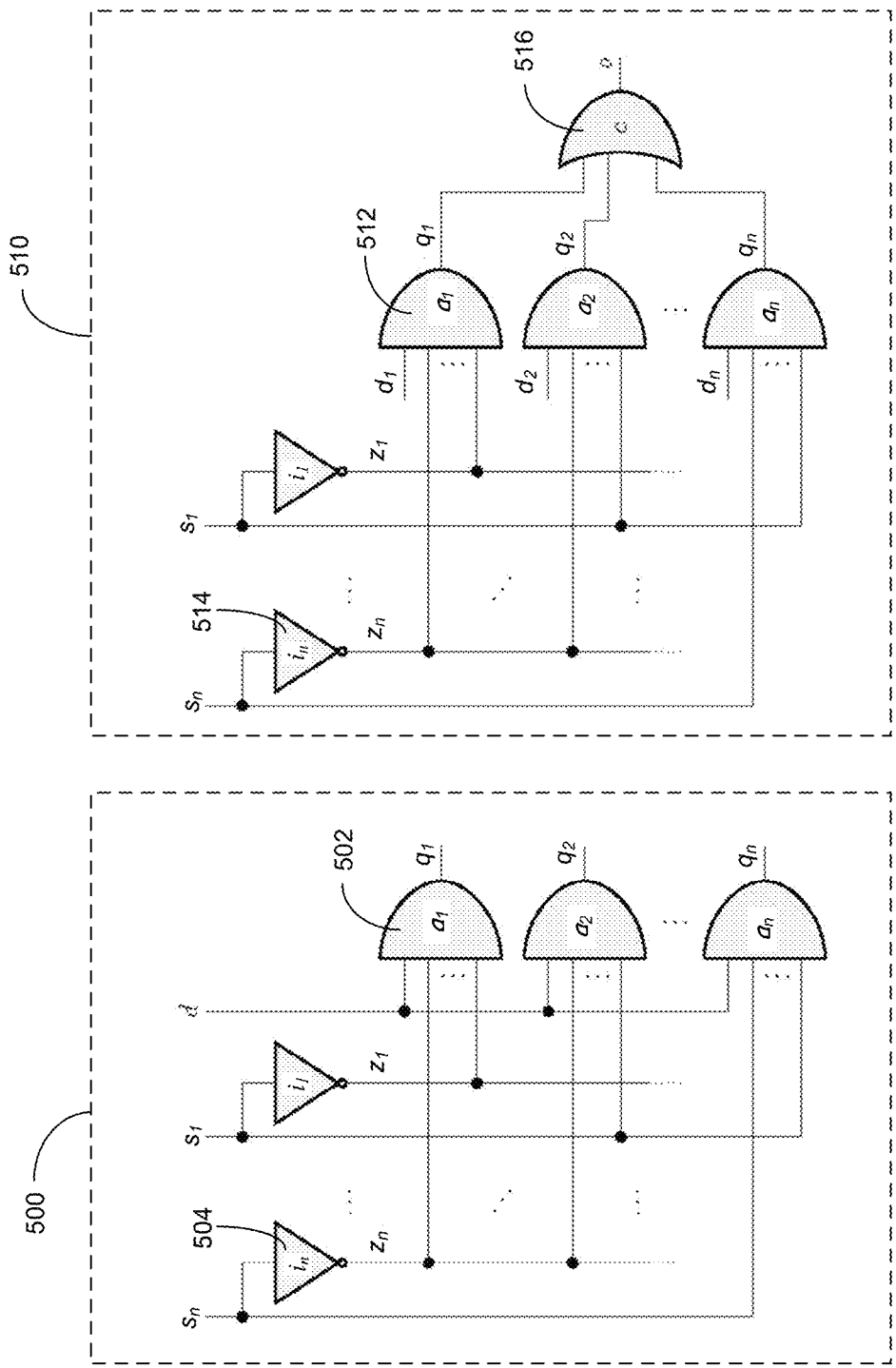
FIG. 5A shows an exemplary demultiplexer used in the universal component cell, according to one embodiment.
FIG. 5B shows an exemplary multiplexer used in the universal component cell, according to one embodiment.

By configuring the demultiplexers and multiplexers, universal component cell 400 can be configured to act as any one of the components included in the universal component cell. The configuration of universal component cell 400 can be a binary value assigned to a vector of selector lines s. The number of selector inputs is $|s|=\lceil\log_2 n\rceil$ for n distinct component types, meaning that the number of items in set s can be given as the smallest integer that is greater than or equal to $\log_2(n)$ FIG. 5A shows an exemplary demultiplexer used in the universal component cell, according to one embodiment. FIG. 5B shows an exemplary multiplexer used in the universal component cell, according to one embodiment. In the example shown in FIGS. 5A and 5B, there are n different types of gates and $|s|=\lceil\log_2 n\rceil$ selector lines. Accordingly, demultiplexer 500 and multiplexer 510 can each include n multi-input AND gates (e.g., AND gates 502 and 512) and |s| inverters (e.g., inverters 504 and 514). The number of selector lines can be arbitrary, making it possible for the multiplexer or demultiplexer to work with a component library having an arbitrary number of components. All AND gates can have s+1 inputs. In addition to the selector inputs, all of the AND gates of demultiplexer 500 can also include an identical input line d. On the other hand, in addition to the selector inputs, each AND gate of multiplexer 510 can include an individual input line $d_i$, where i=1, 2, ..., n. Multiplexer 510 can also include an OR gate 516 with n inputs. The space complexity for both demultiplexer 500 and multiplexer 510 is O(|s|×n), when the multi-input gates are realized with ladders of two-input ones.

The concept of the universal component cell can facilitate a simpler and more straightforward representation of digital circuits. All components within a digital circuit can be represented using a unified format that includes a predetermined number of inputs, a predetermined number of outputs, and the corresponding selector variable set S.

Operations of Automated Digital Design System

As discussed previously, one basic digital design problem is to design a circuit from a given graph. In some embodiments, such a design problem can be reduced to determining if there is a satisfying assignment to a QBF. A QBF solver, in addition to computing if a QBF formula γ is satisfiable, also returns an assignment to the variables in the outermost quantifier.

Figure 6:
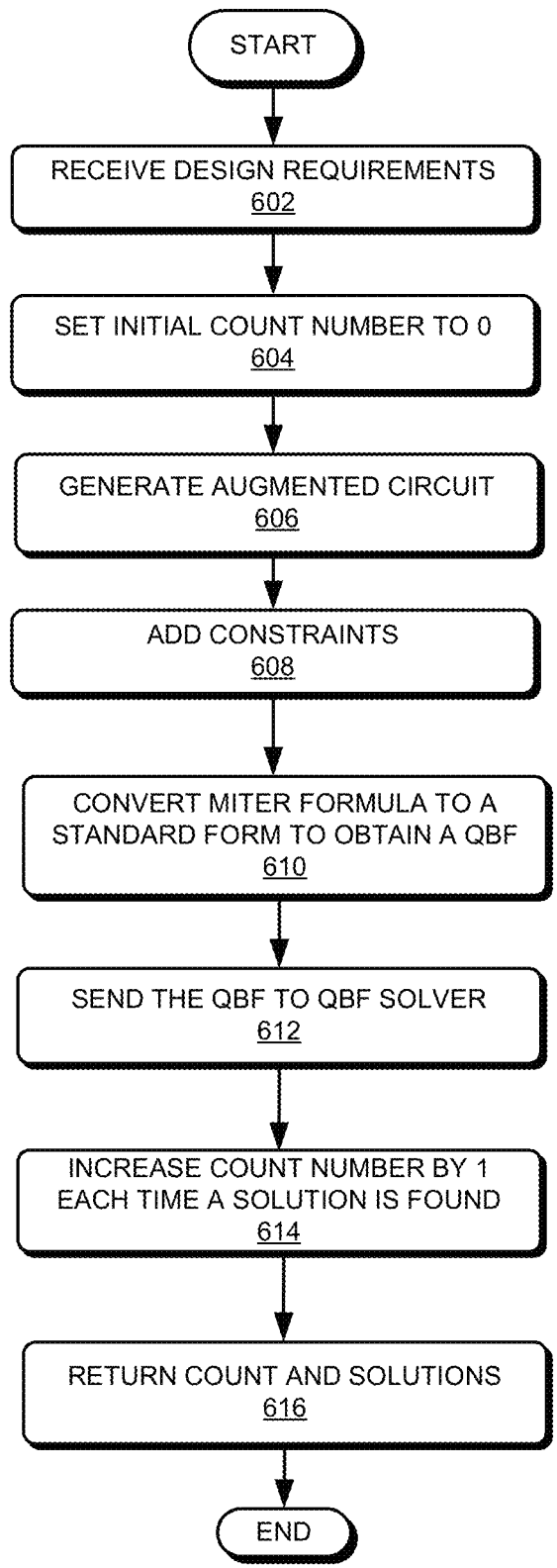
FIG. 6 presents a flowchart illustrating an exemplary process for designing a digital system with a known topology, according to one embodiment.

FIG. 6 presents a flowchart illustrating an exemplary process for designing a digital system with a known topology, according to one embodiment. During operation, the automated digital design system can receive the design requirements, which can be a target circuit ψ or a truth table (operation 602), and set an initial count number to 0 (operation 604). The automated design system can generate an augmented circuit (operation 606). In some embodiments, the automated design system can construct a miter circuit based on the component library, the target circuit, and a candidate circuit. More specifically, target circuit ψ can provide topology information of the to-be-designed system.

Figure 7:
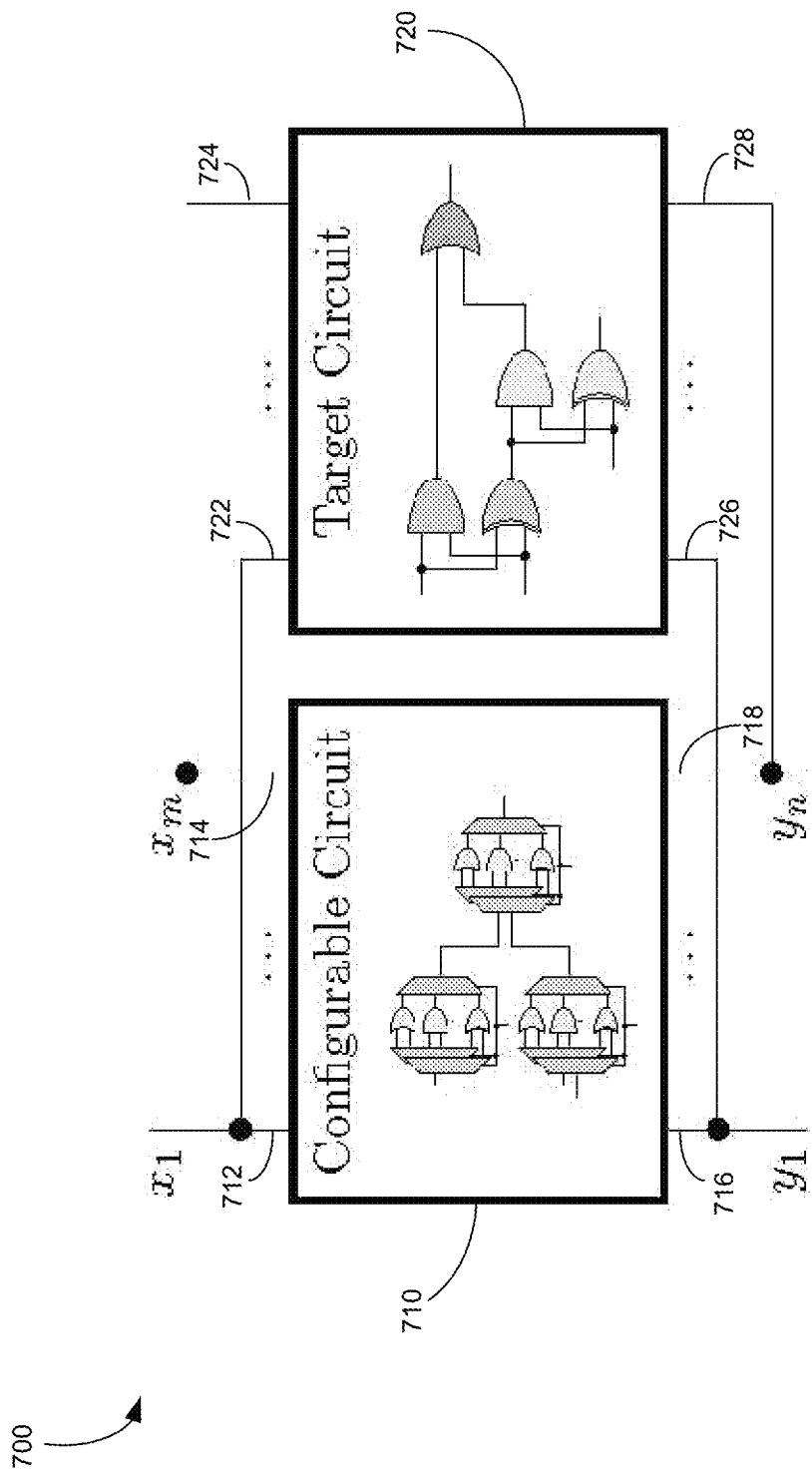
FIG. 7 shows an exemplary miter circuit, according to one embodiment.

FIG. 7 shows an exemplary miter circuit, according to one embodiment. The basic idea of a miter circuit is to relate all inputs and outputs of a candidate circuit φ and a target circuit ψ and to check for satisfiability. A conventional miter circuit uses XOR gates to compare outputs, and the two circuits have different functions if and only if the miter is satisfiable. However, such an approach does not work if the circuit variables include "don't care" values. On the other hand, the XNOR approach can be used in order to obtain the assignment of the internal variables of the candidate circuit, which provides the design solution. This can be done as a second-order QBF formula. In some embodiments, instead of implementing XNOR gates, the automated design system can generate a miter circuit by simply coupling the output wires of the candidate and target circuits together, eliminating 2×|OUT| variables, where |OUT| is the number of output wires.

In some embodiments, the automated design system can generate a miter circuit 700 as shown in FIG. 7. Miter circuit 700 can include a configurable (or candidate) circuit 710 and a target circuit 720. The input wires (e.g., wires 712 and 714) of configurable circuit 710 are coupled to input wires (e.g., wires 722 and 724) of target circuit 720. Similarly, the output wires (e.g., wires 716 and 718) of configurable circuit 710 are coupled to output wires (e.g., wires 726 and 728) of target circuit 720. Note that the coupling of the wires is a metaphor for the fact that the inputs and outputs of configurable circuit 710 and target circuit 720 are forced to be the same. Target circuit 720 may not be an existing circuit but a set of circuit requirements and can be represented by a truth table. The inputs of miter circuit 700 can be denoted $X=\{x_1, x_2, \ldots, x_n\}$, and the outputs of miter circuit 700 can be denoted $Y=\{y_1, y_2, \ldots, y_n\}$.

In some embodiments, all components included in configurable circuit 710 are universal component cells that can be configured to be any component in the component library. The selector lines of all universal component cells together form a variable set S. The solution of the design problem can be an assignment to all variables in S. All of the internal variables of candidate circuit 710 and all of the internal variables of the universal component cells can be included in a variable set Z. Constructing the miter circuit (also referred to as the augmented circuit) can include, in addition to generate the miter formula, generating variable sets S and Z. The topology of candidate circuit 710 can be obtained from target circuit 720. For example, the initial topology can be similar to that of target circuit 720. In some embodiments, the system requirements are in the form of a truth table and the topology of target circuit 720 can be unknown. In such a scenario, the automated design system also needs to generate the system topology. Such a process will be discussed later.

Returning to FIG. 6, subsequent to constructing the augmented circuit, the automated design system can add a predetermined set of constraints to ensure that the designed circuit is a valid circuit (operation 608). The design system can then convert the miter formula to a standard form γ (operation 610). In some embodiments, the automated design system may convert the miter formula to a conjunctive normal form (CNF) in prenex normal form (PNF). Converting the miter circuit to CNF can use a naïve approach without introducing ancillary variables and can apply iteratively the De Morgan's laws of distribution of conjunction over disjunction.

The automated design system can then send a QBF associated with γ to a QBF solver (operation 612). In some embodiments, the QBF solver can implement the Davis-Putnam-Logemann-Loveland (DPLL) algorithm as a subroutine. The QBF solver can solve the miter given the formula ($\exists S \forall X \exists Y \exists Z \gamma$). Whenever a satisfying solution is found, the count is increased by 1 (operation 614). In some embodiments, the QBF solver can perform a complete search to find all possible satisfying solutions. The system can then return the count number along with the solutions (operation 616). Among all satisfying solutions, the solution that uses the lowest number of components can be considered as the optimal design solution.

Figure 8A:
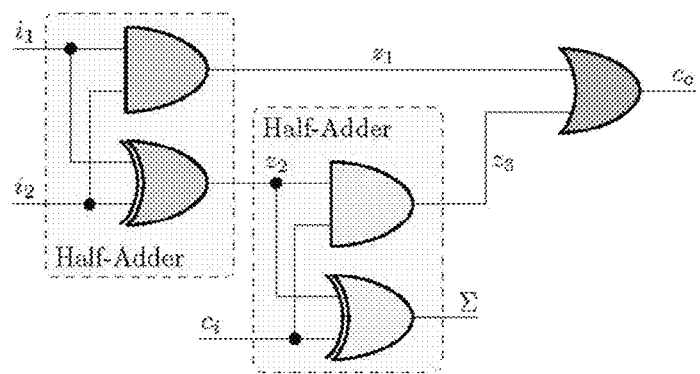
FIG. 8A and FIG. 8B show the target and designed circuits, respectively, according to one embodiment.
Figure 8B:
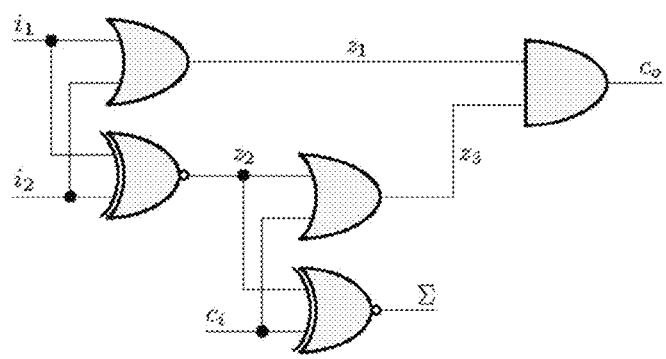

In the example shown in FIGS. 6 and 7, the automated digital design system does not fully generate circuits. It uses the connection graph of the target circuit ψ and only computes the types of nodes (i.e., mapping f). For example, FIG. 8A shows a target circuit and FIG. 8B shows the corresponding designed circuit. More specifically, FIG. 8A shows a full adder and FIG. 8B shows an alternative implementation of the full adder. As one can see, the circuits have similar topologies but different components. More specifically, the alternative circuit shown in FIG. 8B can be viewed as a symmetrical equivalence of the circuit shown in FIG. 8A.

The design approach shown in FIGS. 6 and 7 can be used for designing systems with known or given topologies. For example, a gate array, such as a field-programmable gate array (FPGA), can have a semi-fixed topology, and the design process shown in FIGS. 6 and 7 can facilitate the automated design of FPGAs.

It is desirable for a fully automated digital design system to create the circuit topology. It is also desirable for the automated digital design system to produce a solution that uses the smallest number of components to implement the target function. Under such requirements, the digital design problem can become the optimal design problem, described as: given a target circuit ψ and a component library CL, compose a circuit φ using components from CL, such that φ=ψ and φ has the smallest possible number of components.

Figure 8C:
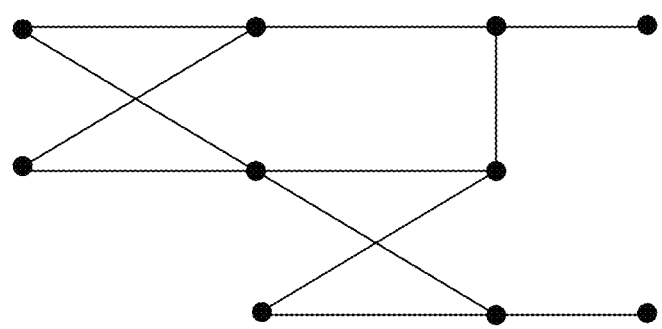
FIG. 8C illustrates an exemplary topology of the full adder shown in FIGS. 8A-8B.

Note that circuit topologies have two aspects, including how the components are connected with each other and how the components interface with the outside environment in terms of the primary inputs and the primary outputs. This can inspire a class of graphs having three types of node: the input nodes, the internal nodes, and the output nodes. It is assumed that each input node is connected to an internal node and the input nodes are connected among themselves. The assumption for the output nodes can be similar. FIG. 8C illustrates an exemplary topology of the full adder shown in FIGS. 8A-8B.

One straightforward approach for solving the optimal design problem is the brute-force circuit enumeration, which considers all possible topology graphs. One possible graph is the fully connected graph. A fully connected graph where the primary inputs, outputs, and internal nodes can be denoted as $K_{|X|,|Y|,|Z|}$, where |X| is the number of the primary inputs, Y the number of the primary outputs, and |Z| the number of the internal variables. A circuit topology of size |X|, |Y|, |Z|, is always a subset of $K_{|X|,|Y|,|Z|}$.

The number of circuit topologies grows rapidly as the size of the circuit grows. The number of directed edges in $K_{m,n,k}$ is |E|=mk+nk+k(k−1)=k(m+n+k−1), and many subsets of E is a valid topology. This can result in a total of $2^{|E|}$ topologies, a number that grows very fast. Hence, the brute-force circuit enumeration approach is not practical even for moderate-sized circuit due to its slow speed.

In some embodiments, the automated design system is capable of encoding the entire circuit generation, including both the component selection and topology generation, as a single QBF satisfiability problem. More specifically, the automated design system can start with a candidate circuit that includes a single component, and then can add, one component at a time, components from the component library to the candidate circuit until an equivalent circuit is discovered.

Figure 9:
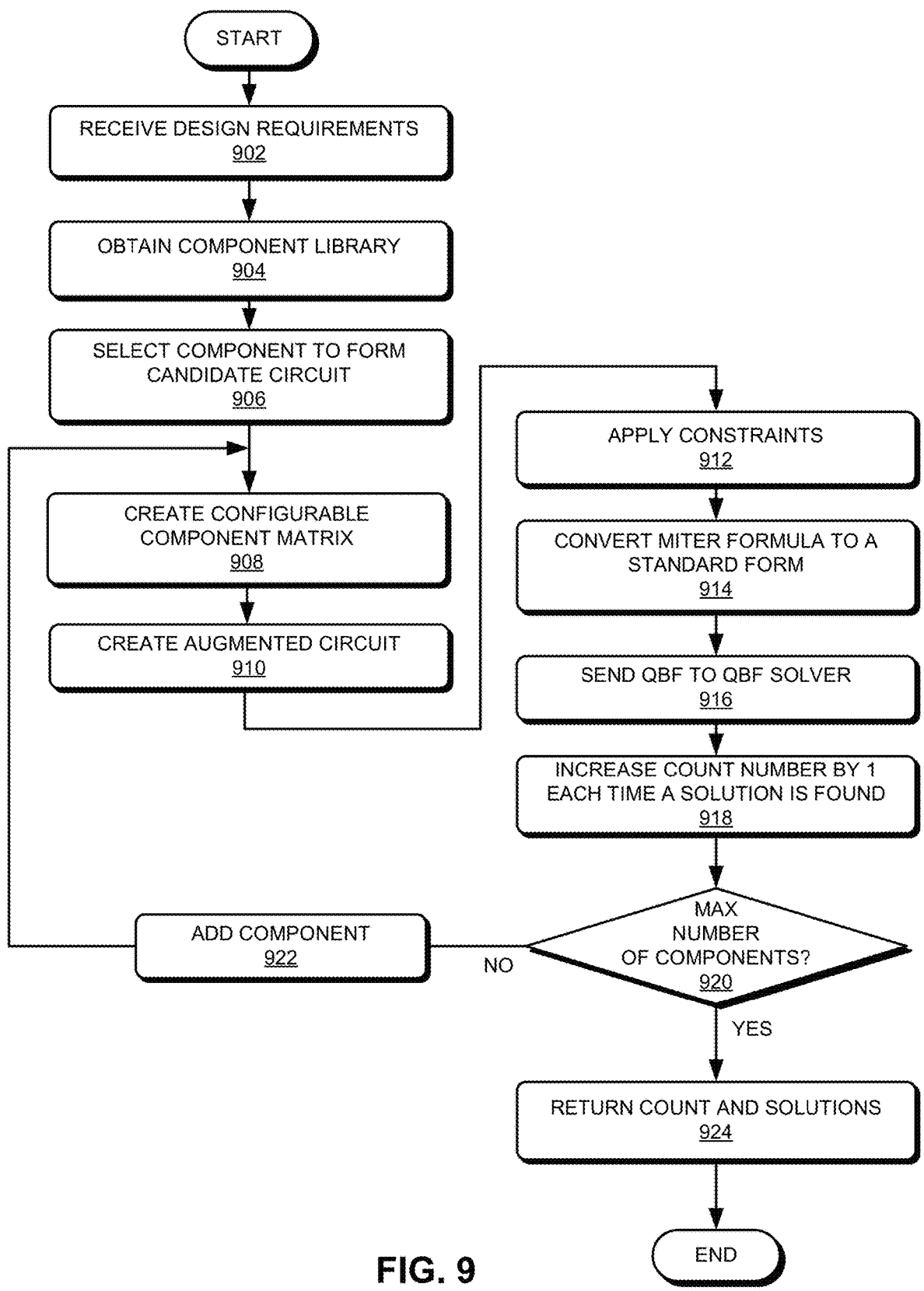
FIG. 9 presents a flowchart illustrating an exemplary process for generating a digital design solution, according to one embodiment.

FIG. 9 presents a flowchart illustrating an exemplary process for generating a digital design solution, according to one embodiment. During operation, the automated design system receives the design requirements (operation 902). The design requirements can be in the form of a known target circuit or a table describing the desired behaviors of the designed system. The automated design system can also obtain a pre-established component library (operation 904). The component library can include universal component cells that can be configured to act as any possible component that may be needed to form the designed system. For designing digital circuits, a universal component cell can be configured to act as any one of the basic one- or two-input logic gates, including but not limited to: a buffer, an AND gate, an OR gate, an XOR gate, a NOT gate, an NAND gate, a NOR gate, an XNOR gate, etc.

The design system can then select one or more components from the component library to form a candidate circuit (operation 906). For example, a candidate circuit may have k components, where 1≤k≤n and n is the maximum number of components in the designed circuit. All inputs in the k components can be included in a set $X_c$ and all outputs in a set $Y_c$. The selector variables can be included in a set $S_c$.

Figure 10:
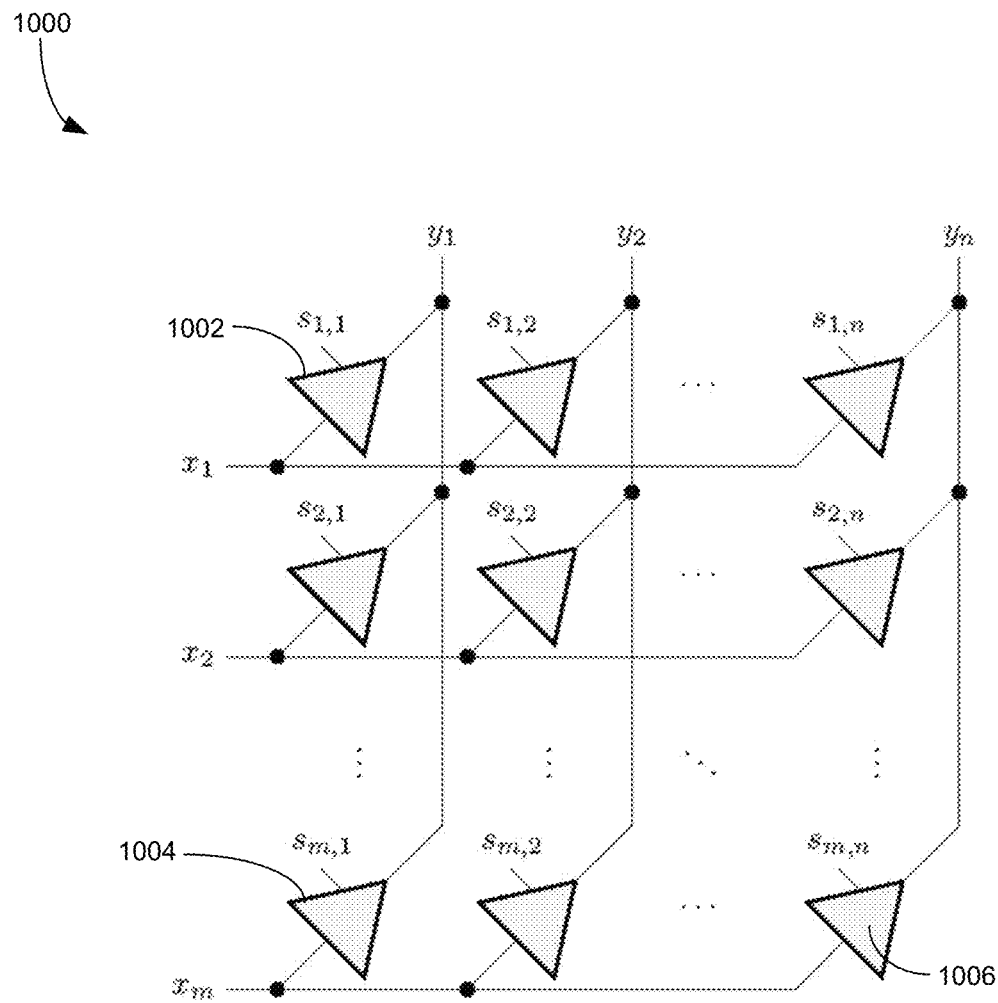
FIG. 10 illustrates an exemplary Boolean circuit modeled as an array of tri-state buffers, according to one embodiment.

Subsequently, the design system can create a configurable component matrix for the candidate circuit (operation 908). Such a configurable component matrix can also be referred to as a connectivity matrix, because it models the topology of the candidate circuit. To model the configurable component matrix, one can create a Boolean circuit by arranging a plurality of tri-state buffers into a two-dimensional (2D) grid. FIG. 10 illustrates an exemplary Boolean circuit modeled as an array of tri-state buffers, according to one embodiment. In FIG. 10, Boolean circuit 1000 can include a plurality of tri-state buffers (e.g., tri-state buffers 1002, 1004, and 1006) that have been arranged into a 2D array. More specifically, the number of rows in the 2D array can be the number of inputs, and the number of columns in the 2D array can be the number of outputs. Each tri-state buffer can be modeled as a propositional formula s→(o↔i), where s is the enable signal, i the input, and o the output. The enable signal s for each tri-state buffer (e.g., tri-state buffer 1002, 1004, or 1006) can have two values: "0" and "1," where "0" means disconnect, and "1" means connect. For example, in FIG. 10, tri-state buffer 1004 couples input $x_m$ and output $y_1$. When the enable signal of tri-state buffer 1004 (i.e., $s_{m,1}$) is set as "1," input $x_m$ will be connected to output $y_1$. Similarly, when the enable signal of tri-state buffer 1006 (i.e., $s_{m,n}$) is set as "0," input $x_m$ will be disconnected from output $y_n$.

Although one can build a Boolean circuit similar to Boolean circuit 1000 shown in FIG. 10 for the k components included in the candidate circuit, such a circuit alone is not enough to find a design solution. This is due to the existence of the "don't care" variables. There is a trivial solution which has all tri-state buffers disabled or in "high impedance." No primary input is then connected to a primary output. The candidate circuit has no wires. This configuration satisfies the QBF formula but does not produce a "valid" circuit. The same situation occurs when the tri-state buffers in the connectivity matrix are connected in such a way that inputs and outputs in the candidate circuit are disconnected. This situation can occur due to wire loops. The component types, then, do not matter.

To ensure that the QBF solver can provide valid circuit designs, in some embodiments, the automated design system can implement a number of constraints, including a cyclic-graph constraint, a direct-primary-input-to-output constraint, a hanging-component-output constraint, a hanging-component-input constraint, a clashing-component-output constraint, an unbalanced-universal-component-cell-ports constraint.

The cyclic-graph constraint can result in the tri-state buffers above the main diagonal of the component connectivity matrix being all disabled. This constraint imposes a strict ordering on the components and ensures that the outputs of each component are connected to the inputs of a successor component only. Note that, instead of disabling these particular tri-state buffers, it can be easier and more efficient to simply remove them.

The direct-primary-input-to-output constraint can result in the disabling of tri-state buffers in the lower-right corner block of the connectivity matrix. This constraint ensures that there are no primary inputs connected directly to primary outputs.

The hanging-component-output constraint ensures that there is an "at-least-one" constraint for each row of the connectivity matrix. Each constraint is converted to a single CNF clause. This constraint ensures that there are no floating component outputs.

The hanging-component-input constraint ensures that there is an "at-least-one" constraint for each column of the connectivity matrix. This ensures that there are no floating component inputs.

The unbalanced-universal-component-cell-ports constraint can prevent connections made to a hanging input. A universal component cell does not necessarily combine components with the same number of inputs and outputs. Consider a component library consisting of an inverter and an AND-gate. The universal component cell will have two inputs and an output. When the multiplexers and demultiplexers are configured to choose the inverter, there will be a hanging input (it does not matter which one). This constraint can prevent other components or primary inputs from being connected to this hanging input.

These constraints can be categorized into two types. The first type includes the cyclic-graph constraint, the hanging-component-output constraint, the hanging-component-input constraint, and the unbalanced-universal-component-cell-ports constraint. The first type of constraints can ensure the validity of the resulting circuit. The second type of constraints can include the direct-primary-input-to-output constraint and the clashing-component-outputs constraint. The second type of constraints can improve the performance of the QBF solver.

Figure 11:
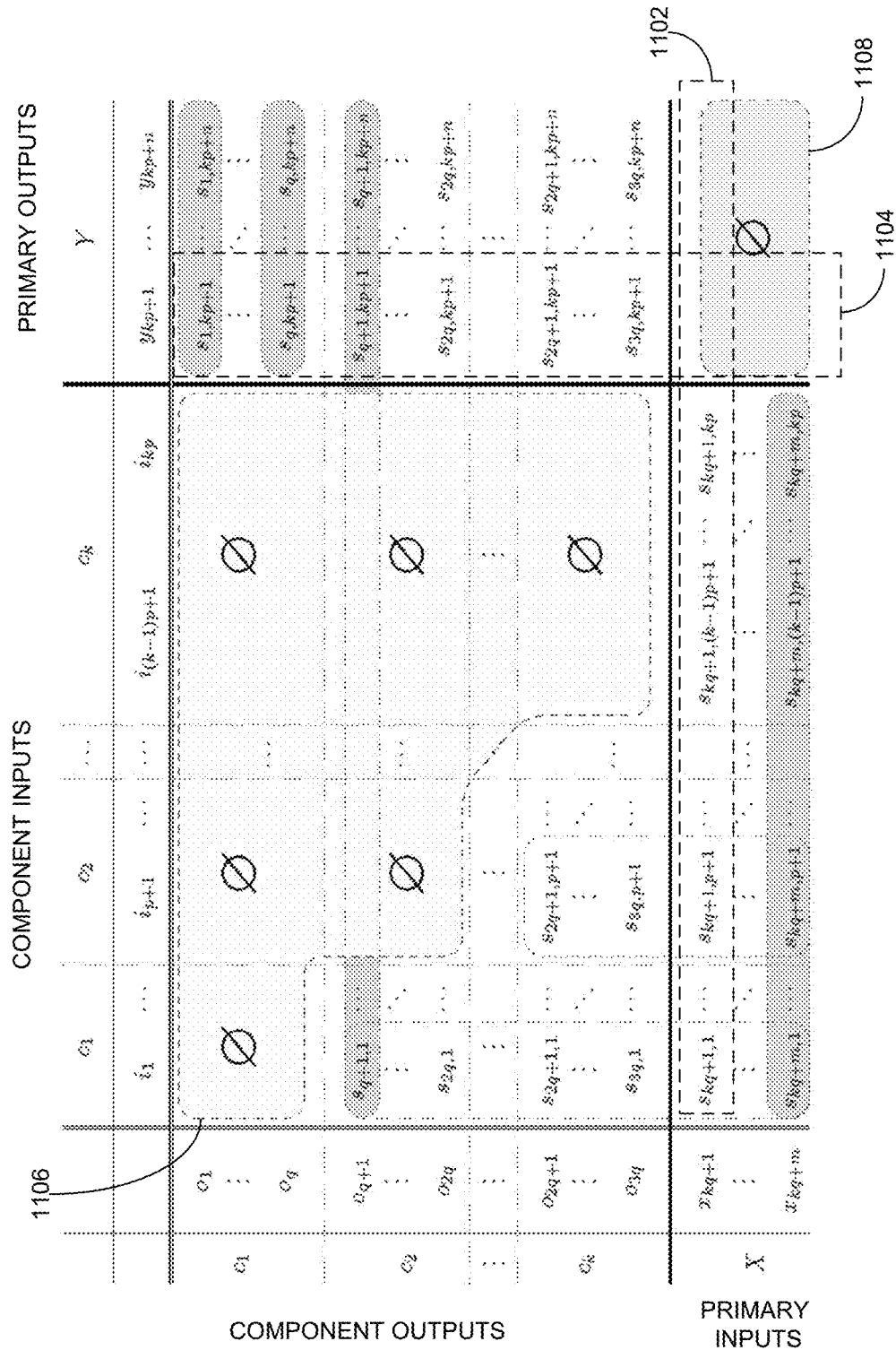
FIG. 11 illustrates a configurable component matrix created for the candidate circuit, according to one embodiment.

FIG. 11 illustrates a configurable component matrix created for the candidate circuit, according to one embodiment. In this example, the topology of the candidate circuit is represented as an adjacency matrix. It is also possible to represent the circuit topology as an adjacency list. In the example shown in FIG. 11, for each of the k components, which are all universal components, there are p inputs and q outputs. As one can see from FIG. 11, there is a row (e.g., row 1102) in the matrix for each of the k universal component cell's outputs and for each primary input. Similarly, there is a column (e.g., column 1104) in the matrix for each of the k universal component cell's inputs and for each of its primary outputs. This reflects the fact that the candidate circuit can be fully configurable.

FIG. 11 also shows the various constraints (e.g., forbidden connections) imposed by the automated design system on the configurable component matrix. More specifically, the constraints are indicated using Ø signs in FIG. 11. More specifically, the Øs included in area 1106 reflect the cyclic-graph constraint, and the Øs included in area 1108 reflect the direct-primary-input-to-output constraint.

Returning to FIG. 9, subsequent to forming the configurable component matrix, the automated design system can create an augmented circuit (e.g., a miter circuit) based on the design requirements and the candidate circuit (operation 910). In some embodiments, creating the augmented circuit can include expanding the component matrix to include the target circuit. The automated design system can further impose a predetermined set of constraints to the component connectivity matrix (operation 912). The automated design system subsequently converts the miter circuit to a standard form (operation 914). In some embodiments, the automated design system can convert the miter circuit to CNF form γ.

The design system can then send a QBF corresponding to γ to a QBF solver, such as a QDPLL solver (operation 916). In some embodiments, the QBF sent to the QDPLL solver can be in the form $(\exists(S \cup E))\forall X \exists Y \exists Z \gamma)$. Each time the QBF solver finds a satisfying solution for the QBF, a count number is increased by 1 (operation 918). Note that the solution for the QBF will be assignments to variables S, which include both the component selection and the circuit topology information. Note that the internal variables $S_c$ determine the component selection, whereas the states of the tri-state buffers determine the circuit topology. In some embodiments, the design system can extract, from a partial certificate outputted by the QBF solver, the circuit configuration. In some embodiments, the design system can also add negated partial certificate to the model before the QBF solver finding additional satisfying solutions, thus improving the efficiency of the QBF solver. To explore the entire design space, in some embodiments, the QBF solver can perform a complete search to find all satisfying solutions.

Subsequent to find all satisfying solutions for a candidate circuit having k components, the automated design system determines whether a predetermined maximum number of components has been reached (operation 920). If not, the design system can add another component to the candidate circuit (operation 922) and then can create a configurable component matrix for the candidate circuit by arranging a plurality of tri-state buffers into a two-dimensional (2D) grid (operation 908). If so, the design system can output the solutions and the total count number (operation 924). The total count number is the number of circuits that can satisfy the design requirements. Using this approach, one can obtain the optimal design that includes the least number of components, because the system can return all possible design solutions. The outputted design solutions can then facilitate a circuit builder to build a physical digital circuit. The circuit builder can build the circuit based on the design solution having a minimum number of components. Alternatively, the circuit builder can choose a design solution that uses components having the least variety.

Figure 12:
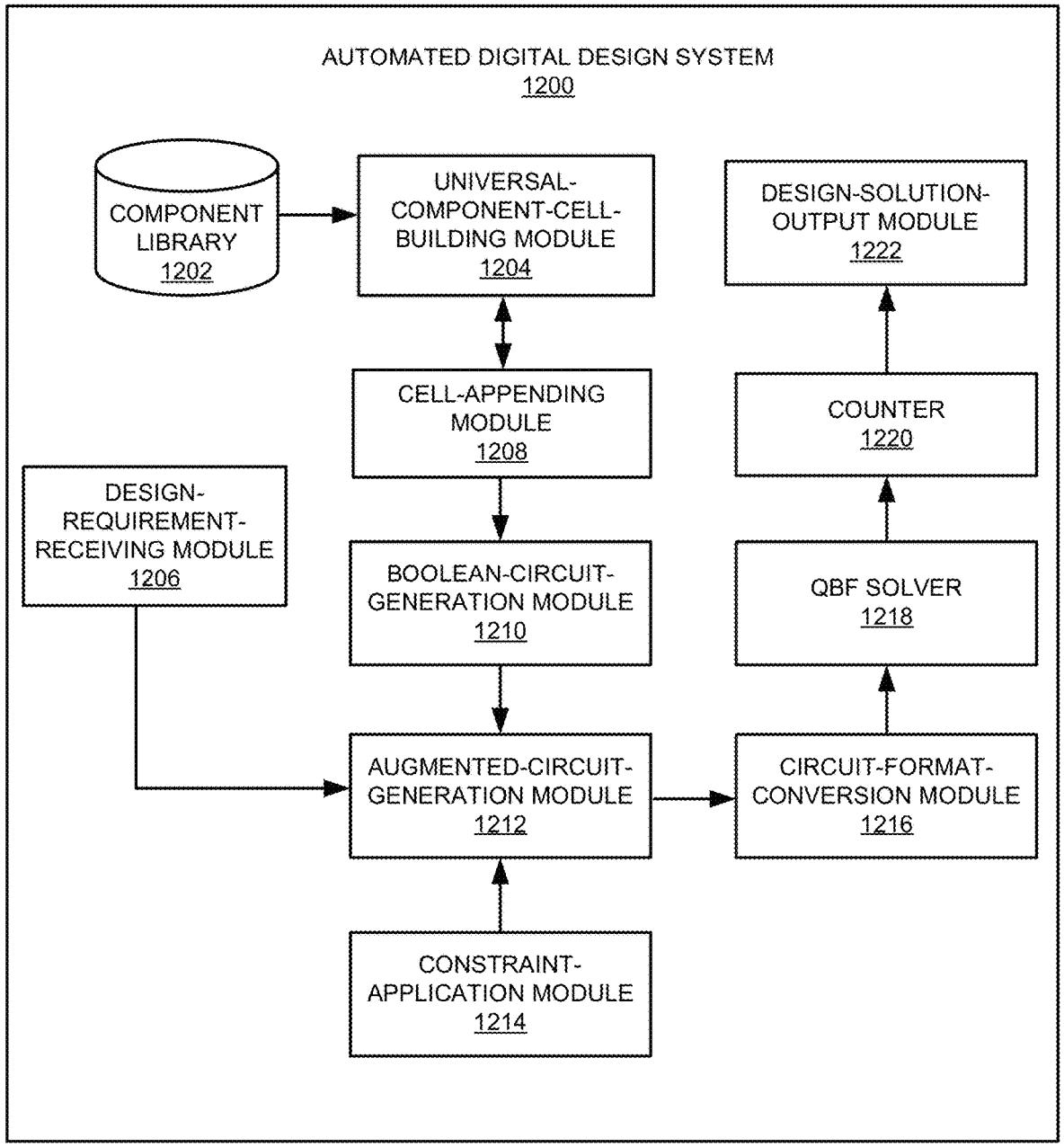
FIG. 12 presents a diagram illustrating an exemplary automated digital design system, according to one embodiment.

FIG. 12 presents a diagram illustrating an exemplary automated digital design system, according to one embodiment. Automated digital design system 1200 can include a component library 1202, a universal-component-cell-building module 1204, a design-requirement-receiving module 1206, a cell-appending module 1208, a Boolean-circuit-generation module 1210, an augmented-circuit-generation module 1212, a constraint-application module 1214, a circuit-format-conversion module 1216, a QBF solver 1218, a counter 1220, and a design-solution-output module 1222.

Component library 1202 can include components used as basic building blocks for building a digital system, including but not limited to: digital electronic circuits, processors, reversible circuits, quantum circuits, optical circuits, computer programming, etc. Depending on the application, component library 1202 can store different types of components. In some embodiments, each component in the component library can be represented by a propositional formula. Universal-component-cell-building module 1204 can be responsible for building universal component cells based on all components stored in component library 1202. More specifically, a universal component cell can be configured to act as any one of the component within the component library. The universal component cells allow the components in a designed circuit to be defined using similar propositional formulas that are based on the inputs, the outputs, and the selection signals, thus making the encoding of the circuit much simpler. In some embodiments, each universal component cell can include demultiplexers and multiplexers that can have a variable number of inputs and outputs, similar to the ones shown in FIGS. 5A and 5B. It is also possible to implement variable input/output multiplexer/demultiplexer using other schemes.

Design-requirement-receiving module 1206 can be responsible for receiving the design requirements. In some situations, the design requirements can be presented as a Boolean circuit indicating the logical relationships among inputs and outputs or a known target circuit. In other situations, the design requirements may be presented as a truth table.

Cell-appending module 1208 can be responsible for appending additional cells (e.g., universal component cells) to a current candidate circuit. The candidate circuit can start with a single component and can be expanded by addition one cell at a time.

Boolean-circuit-generation module 1210 can be responsible for constructing a Boolean circuit that models the current candidate circuit. In some embodiments, the Boolean circuit can be formed by arranging a plurality of tri-state buffers into a grid format. The connectivity relationship of the Boolean circuit can be represented by a configurable component matrix (also referred to as a circuit connectivity matrix).

Augmented-circuit-generation module 1212 can be responsible for generating an augmented circuit (e.g., a miter circuit) used for equivalence checking. In some embodiments, the miter circuit can be created in such a way that inputs and outputs of the candidate circuit are connected to the inputs and outputs, respectively, of the target circuit. Augmenting the circuit can also result in the expansion of the configurable component matrix.

Constraint-application module 1214 can be responsible for applying the various constraints on the target circuit. More particularly, the constraints can be applied on the configurable component matrix. These constraints can ensure that solutions found by the QBF solvers are valid circuits. Circuit-format-conversion module 1216 can convert the circuit to a standard format that can be taken as input by a QBF solver. In some embodiments, circuit-format-conversion module 1216 can convert the circuit to CNF to be sent to a QBF solver. QBF solver 1218 can be a QDPLL QBF solver that can perform a complete search to find all satisfying solutions to the QBF. In some embodiments, instead of performing a complete search, QBF solver 1218 can perform a stochastic search. Counter 1220 can be responsible for counting the number of satisfying solutions. Design-solution-output module 1222 can output the design solutions (i.e., assignments to S and $S_c$) and the counter value.

Exemplary Computer and Communication System

Figure 13:
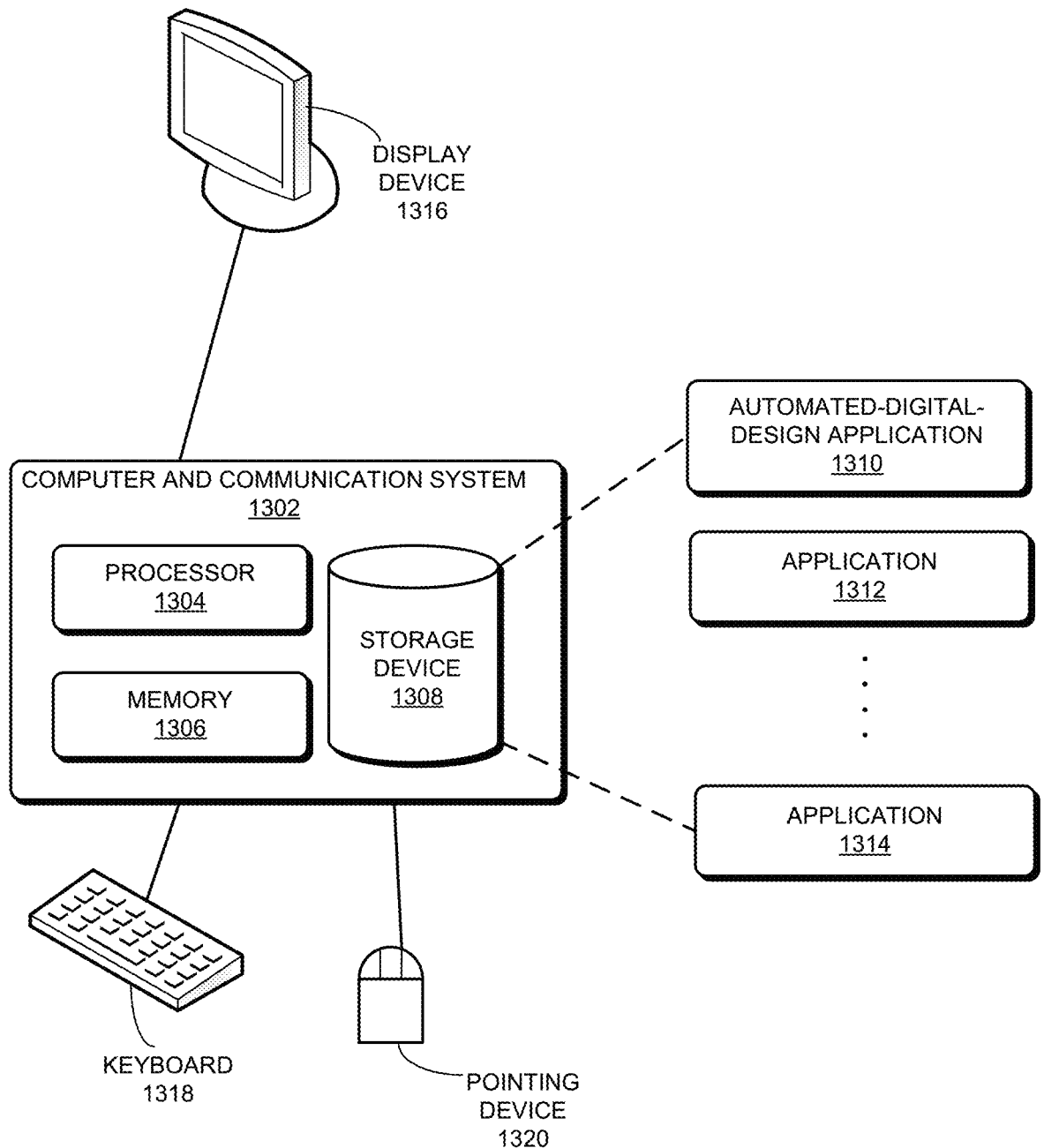
FIG. 13 illustrates an exemplary computer and communication system that facilitates automated design of a digital system, according to one embodiment.

FIG. 13 illustrates an exemplary computer and communication system that facilitates automated design of a digital system, according to one embodiment. A computer and communication system 1302 includes a processor 1304, a memory 1306, and a storage device 1308. Storage device 1308 stores an automated-digital-design application 1310, as well as other applications, such as applications 1312 and 1314. During operation, automated-digital-design application 1310 is loaded from storage device 1308 into memory 1306 and then executed by processor 1304. While executing the program, processor 1304 performs the aforementioned functions. Computer and communication system 1302 is coupled to an optional display 1316, keyboard 1318, and pointing device 1320.

In general, embodiments of the present invention provide a system and method for facilitating automated design of a computational system. More specifically, the automated digital design system uses a novel way to encode the computational system. By implementing universal component cells and by modeling the circuit topology using tri-state buffers arranged into a grid, the automated design system can encode both aspects of the circuit generation (i.e., component selection and topology generation) into a single logic formula (e.g., a QBF satisfiability problem) that can be solved by state-of-the-art solvers.

Although the examples shown in FIGS. 4-12 are for designing digital electronic circuits, the same principle can be implemented while designing other types of computational systems, such as reversible computing circuits, quantum circuits, optical circuits comprising optical gates, quantum optical circuits, processors, computer programs, etc.

In the aforementioned examples, the QBF solver is a QDPLL solver. In practice, other types of QBF solvers can also be used to solve the QBF. The scope of this disclosure is not limited to the detailed algorithms for solving the QBF.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automated design of a physical computational system, comprising:
   obtaining, by a computer, a component library comprising a plurality of computational components;
   receiving design requirements of the physical computational system;
   building a plurality of universal component cells, wherein a respective universal component cell is configurable, by a selection signal, to behave as one of the plurality of computational components;
   constructing a candidate computational system using the plurality of universal component cells;
   encoding the received design requirements and the candidate computational system into a single logic formula by constructing a miter structure based on the design requirements and the candidate computational system, wherein variables within the single logic formula comprise at least inputs, outputs, and selection signals of the universal component cells within the candidate computational system, wherein the single logic formula comprises a quantified Boolean formula (QBF);
   executing, by the computer, a QBF solver to solve the QBF in order to obtain at least one design solution for the physical computational system, wherein solving the QBF comprises searching for satisfying assignments to the selection signals; and
   outputting the at least one design solution, thereby facilitating a system builder to build the physical computational system.

2. The method of claim 1, wherein constructing the candidate computational system comprises constructing the candidate computational system based on a predetermined topology.

3. The method of claim 1, wherein constructing the candidate computational system comprises appending additional universal component cells, one cell at a time, to an initial universal component cell.

4. The method of claim 3, wherein encoding the received design requirements and the candidate computational system into the single logic formula comprises modeling the candidate computational system using a Boolean circuit comprising a plurality of tri-state buffers, wherein a potential connection within the candidate computational system is modeled by an enable signal of a tri-state buffer corresponding to the potential connection, and wherein solving the single logic formula comprises at least searching for satisfying assignments to enable signals of the tri-state buffers.

5. The method of claim 1, wherein encoding the received design requirements and the candidate computational system into the single logic formula further comprises applying a plurality of predetermined constraints.

6. The method of claim 1, wherein the computational components in the component library comprise one or more of:
   a digital circuit gate;
   a quantum gate;
   an optical gate; and
   a reversible gate.

7. A non-transitory computer-readable storage medium storing instructions that when executed by a computer cause the computer to perform a method for automated design of a physical computational system, the method comprising:
   obtaining a component library comprising a plurality of computational components;
   receiving design requirements of the physical computational system;
   building a plurality of universal component cells, wherein a respective universal component cell is configurable, by a selection signal, to behave as one of the plurality of computational components;
   constructing a candidate computational system using the plurality of universal component cells;
   encoding the received design requirements and the candidate computational system into a single logic formula by constructing a miter structure based on the design requirements and the candidate computational system, wherein variables within the single logic formula comprise at least inputs, outputs, and selection signals of the universal component cells within the candidate computational system, wherein the single logic formula comprises a quantified Boolean formula (QBF);

executing, by a computer, a QBF solver to solve the QBF in order to obtain at least one design solution for the physical computational system, wherein solving the QBF comprises searching for satisfying assignments to the selection signals; and outputting the at least one design solution, thereby facilitating a system builder to build the physical computational system.

8. The non-transitory computer-readable storage medium of claim 7, wherein constructing the candidate computational system comprises constructing the candidate computational system based on a predetermined topology.

9. The non-transitory computer-readable storage medium of claim 7, wherein constructing the candidate computational system comprises appending additional universal component cells, one cell at a time, to an initial universal component cell.

10. The non-transitory computer-readable storage medium of claim 9, wherein encoding the received design requirements and the candidate computational system into the single logic formula comprises modeling the candidate computational system using a Boolean circuit comprising a plurality of tri-state buffers, wherein a potential connection within the candidate computational system is modeled by an enable signal of a tri-state buffer corresponding to the potential connection.

11. The non-transitory computer-readable storage medium of claim 7, wherein the computational components in the component library comprise one or more of:
   a digital circuit gate;
   a quantum gate;
   an optical gate; and
   a reversible gate.

12. A computer system for automated design of a physical computational system, the system comprising:
   a processor; and
   a storage device coupled to the processor and storing instructions, which when executed by the processor cause the processor to perform a method, wherein the method comprises:
      obtaining a component library comprising a plurality of computational components;
      receiving design requirements of the physical computational system;
      building a plurality of universal component cells, wherein a respective universal component cell is configurable, by a selection signal, to behave as one of the plurality of computational components;
      constructing a candidate computational system using the plurality of universal component cells;
      encoding the received design requirements and the candidate computational system into a single logic formula by constructing a miter structure based on the design requirements and the candidate computational system, wherein variables within the single logic formula comprise at least inputs, outputs, and selection signals of the universal component cells within the candidate computational system, wherein the single logic formula comprises a quantified Boolean formula (QBF);
      executing, by the computer system, a QBF solver to solve the QBF in order to obtain at least one design solution for the physical computational system, wherein solving the QBF comprises searching for satisfying assignments to the selection signals; and
      outputting the at least one design solution, thereby facilitating a system builder to build the physical computational system.

13. The computer system of claim 12, wherein constructing the candidate computational system comprises constructing the candidate computational system based on a predetermined topology.

14. The computer system of claim 12, wherein constructing the candidate computational system comprises appending additional universal component cells, one cell at a time, to an initial universal component cell.

15. The computer system of claim 14, wherein encoding the received design requirements and the candidate computational system into the single logic formula comprises modeling the candidate computational system using a Boolean circuit comprising a plurality of tri-state buffers, wherein a potential connection within the candidate computational system is modeled by an enable signal of a tri-state buffer corresponding to the potential connection.

16. The computer system of claim 12, wherein the computational components in the component library comprise one or more of:
   a digital circuit gate;
   a quantum gate;
   an optical gate; and
   a reversible gate.

* * * * *